(12) United States Patent
Nakamura et al.

(10) Patent No.: US 11,726,331 B2
(45) Date of Patent: Aug. 15, 2023

(54) HEAD MOUNTED DISPLAY

(71) Applicant: Hitachi-LG Data Storage, Inc., Tokyo (JP)

(72) Inventors: Toshiteru Nakamura, Tokyo (JP); Takuma Kuno, Tokyo (JP); Takahiro Mouri, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 73 days.

(21) Appl. No.: 17/329,320

(22) Filed: May 25, 2021

(65) Prior Publication Data
US 2022/0066215 A1 Mar. 3, 2022

(30) Foreign Application Priority Data
Aug. 28, 2020 (JP) .................................. 2020-143984

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0018* (2013.01); *G02B 6/0028* (2013.01);
(Continued)

(58) Field of Classification Search
CPC .... G02B 2027/0123; G02B 2027/0178; G02B 27/0172; G02B 27/017; G02B 6/0035;
(Continued)

(56) References Cited

U.S. PATENT DOCUMENTS 8,570,244 B2 * 10/2013 Mukawa ............ G02B 27/0172
345/207
8,964,300 B2 * 2/2015 Mukawa ............ G02B 27/0172
359/630
(Continued)

FOREIGN PATENT DOCUMENTS

CN 108333752 A * 7/2018 ......... G02B 27/0172
CN 108508523 A * 9/2018 ......... G02B 27/0172
(Continued)

*Primary Examiner* — Thomas A Hollweg
*Assistant Examiner* — Mary A El-Shammaa
(74) *Attorney, Agent, or Firm* — Mattingly & Malur, PC

(57) ABSTRACT

A head mounted display displays an image in a user's view field and includes a projection unit projecting image light from an image display unit; and a first and second light guide plates that duplicate the image light from the projection unit. The first and second light guide plates each include a set of parallel main surfaces confining the image light by internal reflection. The first light guide plate includes an incident surface reflecting the image light inward, and two or more emission reflective surfaces emitting the image light to the second light guide plate. The incident and emission reflective surfaces are parallel to each other at an angle different from the main surface, and the second light guide plate includes an input unit coupling the image light from the first light guide plate inward, and an output unit emitting the image light to the user's pupil.

14 Claims, 16 Drawing Sheets

(51) Int. Cl.
  *G06F 3/01*   (2006.01)
  *G06F 3/16*   (2006.01)
(52) U.S. Cl.
  CPC ........... *G02B 6/0035* (2013.01); *G06F 3/012* (2013.01); *G06F 3/16* (2013.01); *G02B 2027/0123* (2013.01)
(58) Field of Classification Search
  CPC ..... G02B 6/0028; G02B 6/0018; G06F 3/012; G06F 3/16
  See application file for complete search history.

(56) References Cited

U.S. PATENT DOCUMENTS

| | | | |
|---|---|---|---|
| 2003/0165017 A1 | 9/2003 | Amitai | |
| 2005/0180687 A1* | 8/2005 | Amitai | G02B 27/286 385/31 |
| 2007/0070859 A1* | 3/2007 | Hirayama | G02B 27/0172 369/112.04 |
| 2015/0153574 A1* | 6/2015 | Komatsu | G02B 27/017 345/8 |
| 2015/0378074 A1* | 12/2015 | Kollin | G02B 5/3016 359/485.05 |
| 2018/0095283 A1* | 4/2018 | Takeda | G02B 6/005 |
| 2018/0203237 A1* | 7/2018 | Shih | G02B 6/0028 |
| 2018/0348562 A1* | 12/2018 | Yoshida | G02F 1/133605 |
| 2023/0083745 A1* | 3/2023 | Kuno | G02B 27/0172 |

FOREIGN PATENT DOCUMENTS

| | | | | |
|---|---|---|---|---|
| CN | 111164494 A | * | 5/2020 | ......... G02B 27/0172 |
| CN | 114730111 A | * | 7/2022 | ......... G02B 27/0172 |
| JP | 2003-536102 A | | 12/2003 | |
| WO | WO-2017223121 A1 | * | 12/2017 | ......... G02B 27/0081 |
| WO | WO-2022176406 A1 | * | 8/2022 | |

* cited by examiner

F I G. 1 A
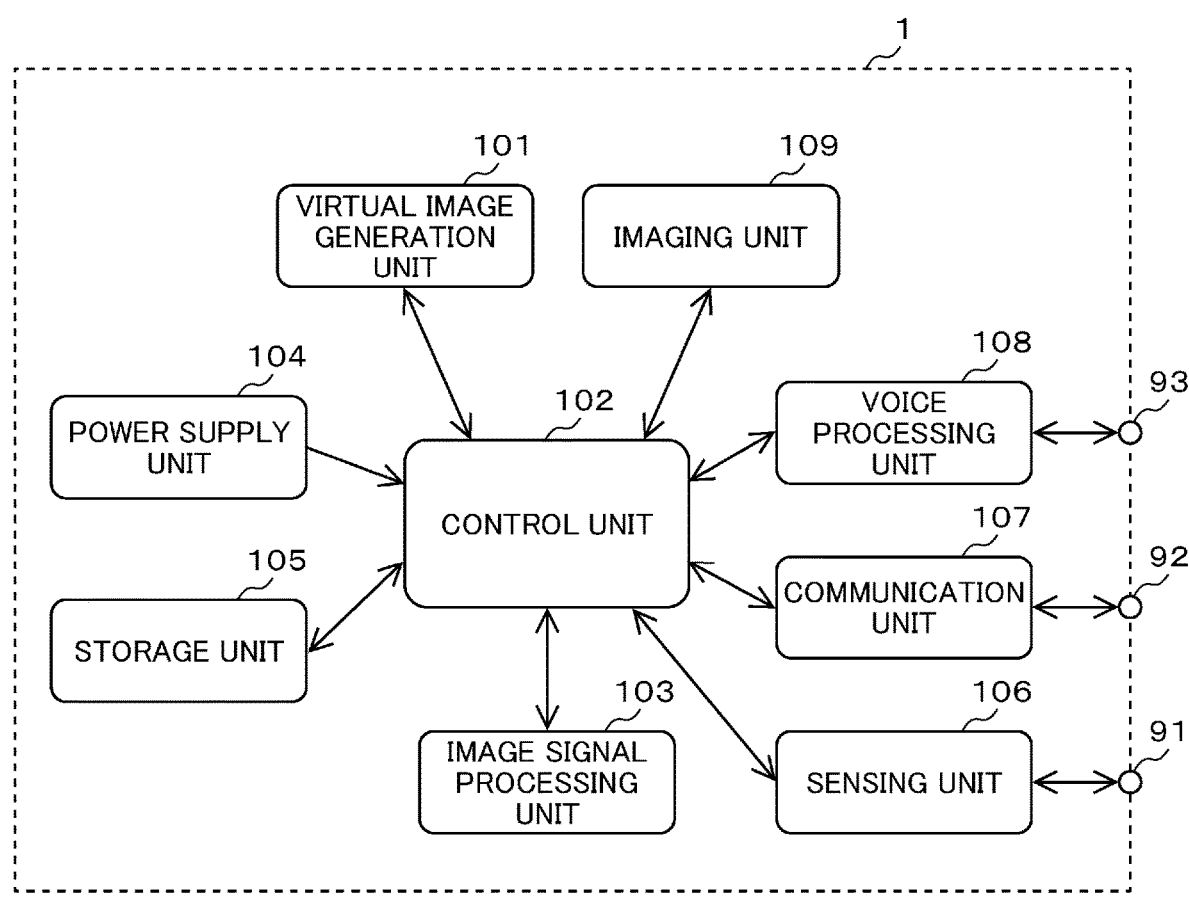

F I G. 1 B
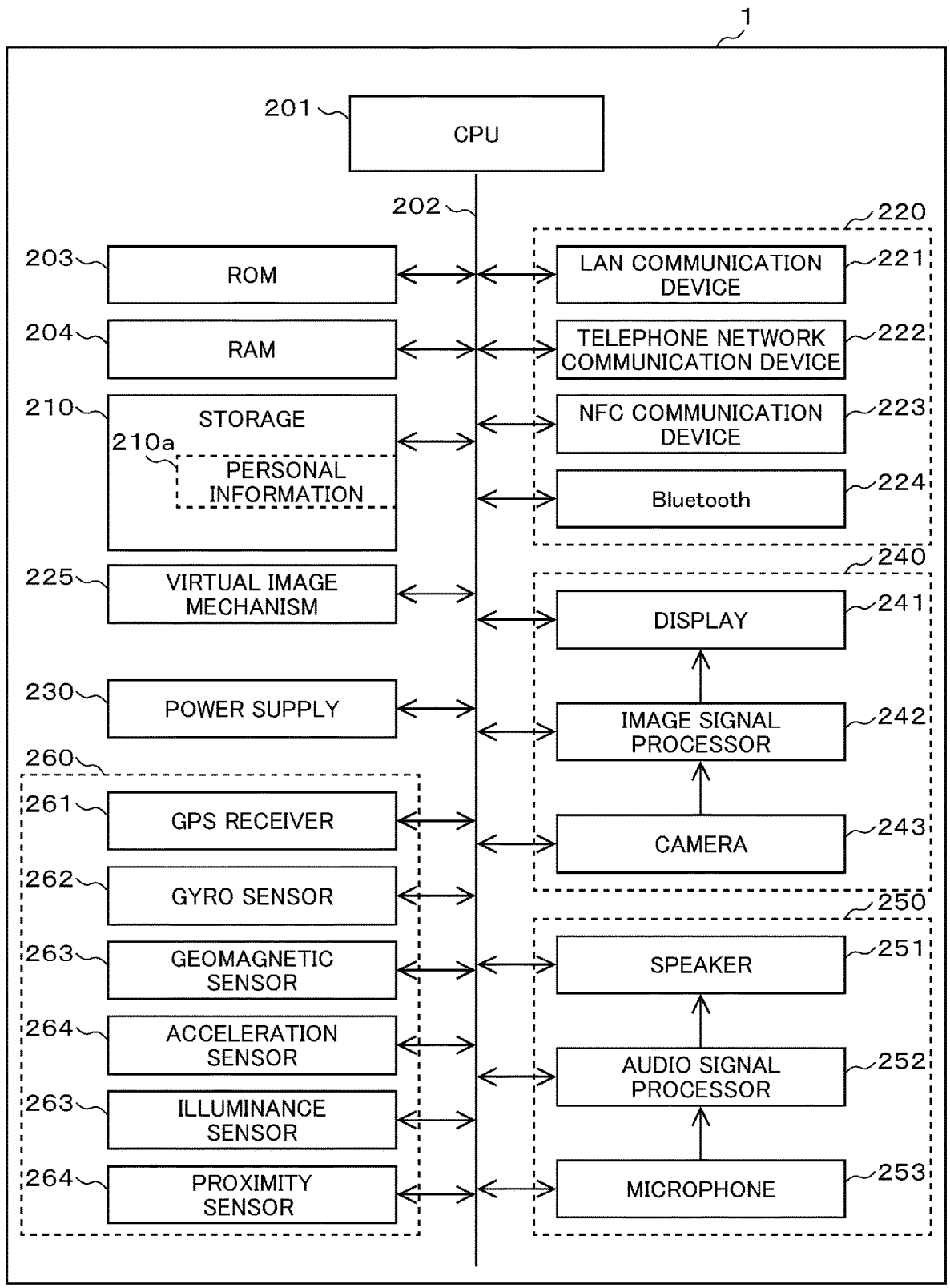

FIG. 9
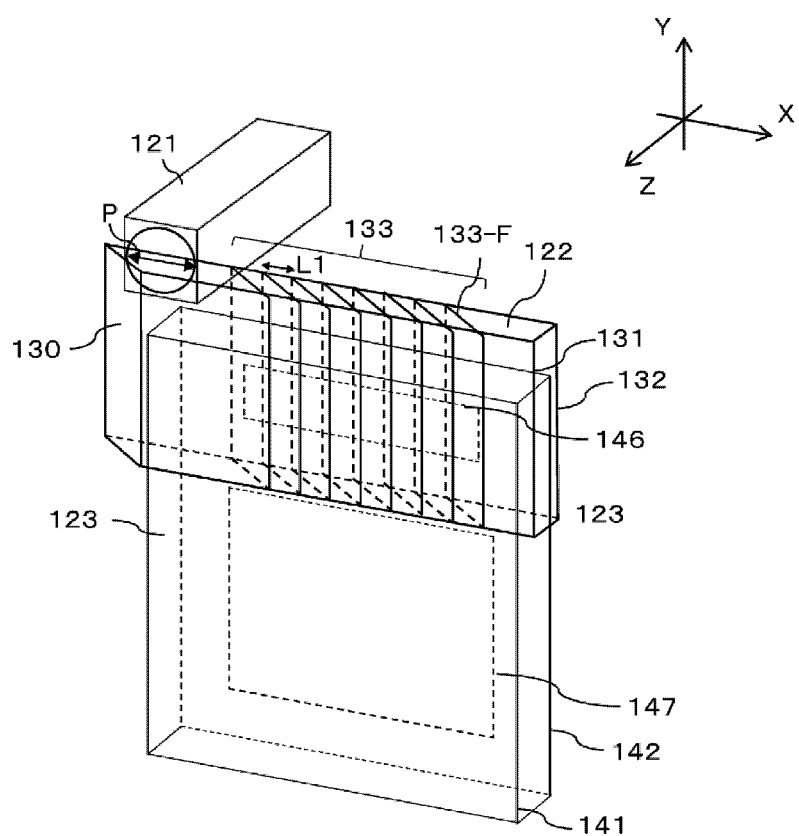
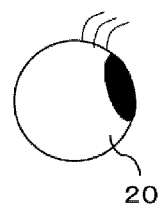

F I G. 1 1 A
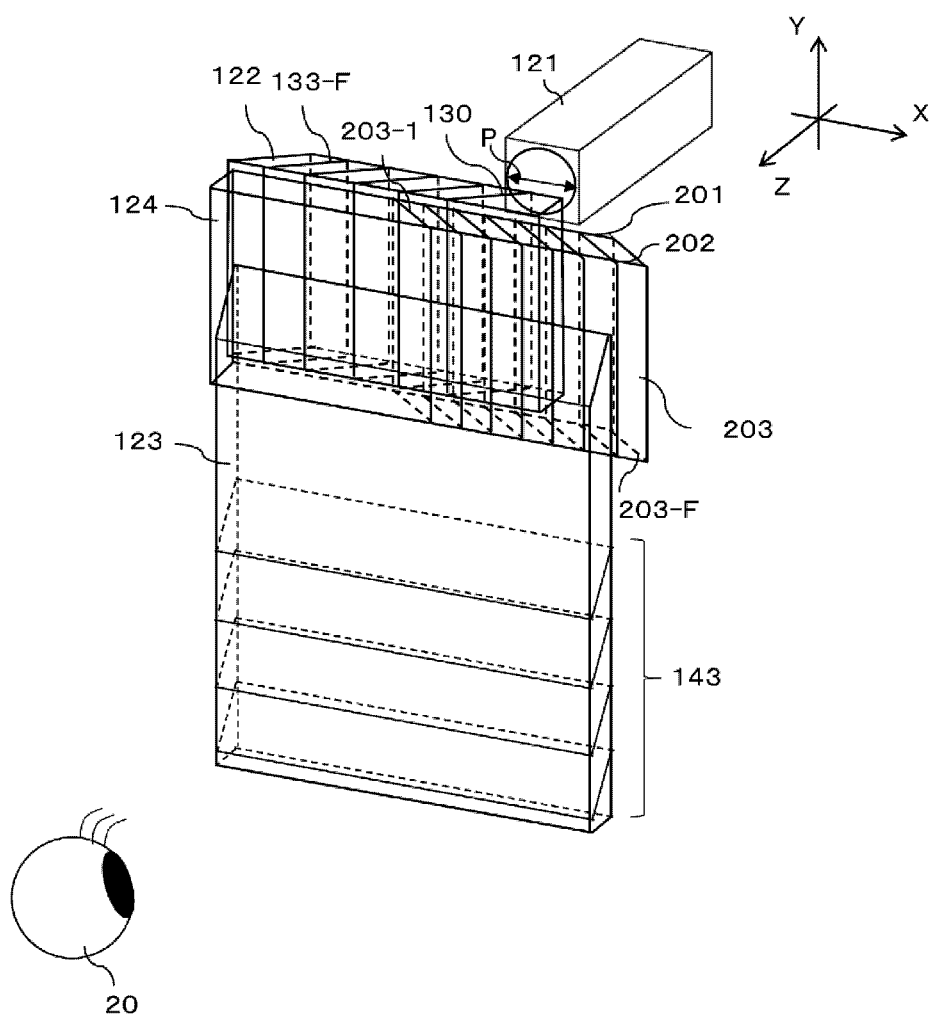

F I G. 1 3
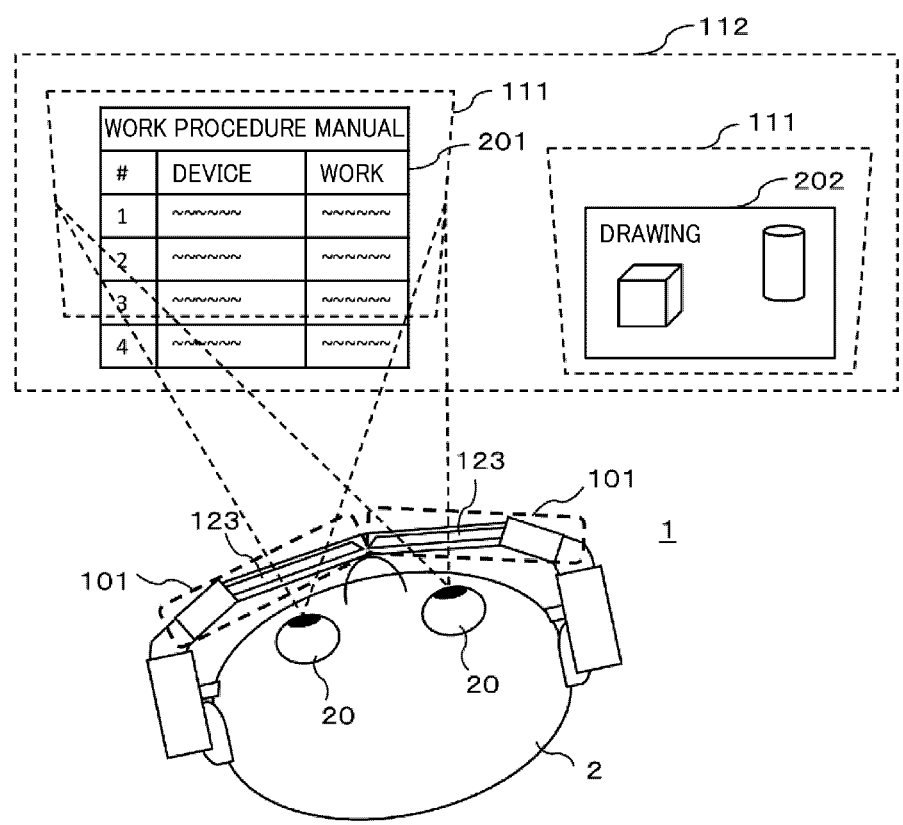

HEAD MOUNTED DISPLAY

CROSS-REFERENCE TO RELATED APPLICATION

The present application claims priority from Japanese application JP 2020-143984, filed on Aug. 28, 2020, the contents of which is hereby incorporated by reference into this application.

BACKGROUND OF THE INVENTION

The present invention relates to a head mounted display that is mounted on a head of a user and displays an image in a field of view.

Wearable devices such as head mounted displays (hereinafter also abbreviated as HMDs) are required to have a structure that is compact and easy to wear, as well as display performance such as ensuring good visibility and visibility of images.

Japanese Unexamined Patent Application Publication (Translation of PCT Application) No. 2003-536102 is a prior art document in the present technical field. Japanese Unexamined Patent Application Publication (Translation of PCT Application) No. 2003-536102 discloses an optical device configured to include a flat substrate that transmits light, an optical unit for connecting light into the substrate by an entire internal reflection, and multiple partial reflective surfaces of the substrate, the partial reflective surfaces being parallel to each other and not parallel to any edge of the substrate.

SUMMARY OF THE INVENTION

An optical system of the HMD includes an image display unit equipped with an illumination unit that transmits light emitted by a light source unit to a small display unit, and a projection unit that projects image light (virtual image) generated by the image display unit. If a position of the HMD is displaced with respect to user's pupils, a screen is cut off. Therefore, while a pupil duplication unit and a light guide plate are used to enlarge an eye box, there are problems that the enlargement of the eye box increases a size of the optical system and reduces the optical efficiency.

Furthermore, the small display placed in the image display unit is generally an element with different vertical and horizontal screen aspects. When displaying an image with a long horizontal aspect as the display screen, it is necessary that a long side direction of the screen of the image light from the small display is incident in a horizontal plane direction of the projection unit, correspondingly. The above restriction leads to a problem that the long side direction of the small display increases a width of a virtual image generation unit, and the designability of the HMD is reduced.

In Japanese Unexamined Patent Application Publication (Translation of PCT Application) No. 2003-536102, the above problems are not taken into consideration when achieving both the expansion of the eye box of the optical system and the miniaturization of the HMD optical system.

An object of the present invention is to provide an HMD that achieves both miniaturization of an optical system and expansion of an eye box.

According to the present invention, for example, there is provided a head mounted display that displays an image in the user's field of view, which includes: an image display unit that generates an image to be displayed; a projection unit that projects image light from the image display unit; and a first light guide plate and a second light guide plate that duplicate the image light from the projection unit, in which the first light guide plate and the second light guide plate each include a set of parallel main surfaces that confine the image light by internal reflection, the first light guide plate includes an incident surface that reflects the image light inward, and two or more emission reflective surfaces that emit the image light to the second light guide plate, the incident surface and the emission reflective surface are parallel to each other and at an angle different from the main surface, and the second light guide plate includes an input unit that couples the image light from the first light guide plate to the internal, and an output unit that emits the image light to user's pupil.

According to the present invention, there can be provided an HMD that achieves both miniaturization of the optical system and expansion of the eye box.

BRIEF DESCRIPTION OF THE DRAWINGS

FIG. 1A is a block configuration diagram of an HMD according to Example 1;

FIG. 1B is a diagram showing an example of a hardware configuration of the HMD shown in FIG. 1A;

FIG. 9 shows a modification of the first and second light guide plates in Example 1;

FIG. 11A is a configuration diagram of the first, second, and third light guide plates in Example 2;

FIG. 13 is a diagram showing an example of using an HMD in Example 3; and

DETAILED DESCRIPTION OF THE PREFERRED EMBODIMENTS

Figure 2:
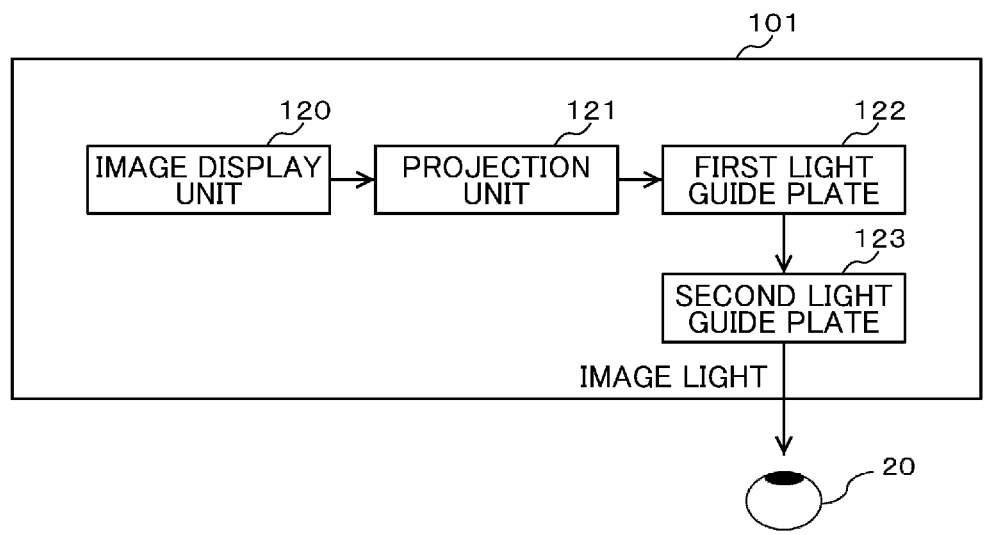
FIG. 2 is a block configuration diagram of a virtual image generation unit according to Example 1.

Hereinafter, embodiments of the present invention will be described with reference to the drawings. The following description and drawings are examples for illustrating the present invention, and are appropriately omitted or simplified for clarification of the description. The present invention can be implemented in various other forms. Unless otherwise specified, each component may be singular or plural.

The position, size, shape, range, etc. of each component shown in the drawings may not represent the actual position, size, shape, range, etc. in order to facilitate understanding of the invention. Therefore, the present invention is not necessarily limited to the position, size, shape, range, etc. disclosed in the drawings.

In the following description, various information may be described by expressions such as "table" and "list", but various information may be expressed by a data structure other than those expressions. In order to indicate no dependence on the data structure, "XX table", "XX list", etc. are sometimes called "XX information". When describing identification information, if expressions such as "identification information", "identification", "name", "ID", and "number" are used, those expressions can be replaced with each other.

If there are multiple components with the same or similar functions, a description may be made by adding different subscripts to the same symbols. However, when it is not necessary to distinguish between those multiple components, the subscript may be omitted for description.

In addition, in the following description, processing performed by executing a program may be described, but the program is executed by a processor (for example, CPU (Central Processing Unit), GPU (Graphics Processing Unit)) so that since predetermined processing is appropriately performed by using a storage resource (for example, a memory) and/or an interface device (for example, a communication port), a main body of the processing may be a processor. Similarly, a main body of processing performed by executing the program may be a controller, device, system, computer, or node having a processor. The main body of processing performed by executing the program may be a calculation unit, and may include a dedicated circuit (for example, FPGA (Field-Programmable Gate Array) or an ASIC (Application Specific Integrated Circuit) that performs specific processing.

The program may be installed from a program source into a device such as a computer. The program source may be, for example, a program distribution server or a computer-readable storage media. If the program source is the program distribution server, the program distribution server includes a processor and a storage resource for storing the program to be distributed, and the processor of the program distribution server may distribute the program to be distributed to other computers. Also, in the following description, two or more programs may be realized as one program, or one program may be realized as two or more programs.

Example 1

FIG. 1A is a block configuration diagram of an HMD in this example. In FIG. 1A, an HMD 1 includes a virtual image generation unit 101, a control unit 102, an image signal processing unit 103, a power supply unit 104, a storage unit 105, a sensing unit 106, a communication unit 107, a voice processing unit 108, an imaging unit 109, and I/O units 91 to 93.

The virtual image generation unit 101 magnifies and projects an image displayed on a small display unit (micro display) as a virtual image, and displays the image of augmented reality (AR) or mixed reality (MR) in a wearer's (user's) field of view.

The control unit 102 controls the entire HMD 1 in an integrated manner. The function of the control unit 102 is realized by an arithmetic unit such as a CPU. The image signal processing unit 103 supplies a display image signal to the display unit in the virtual image generation unit 101. The power supply unit 104 supplies power to each part of the HMD 1.

The storage unit 105 stores information required for processing each part of the HMD 1 and information generated by each part of the HMD 1. Also, when the function of the control unit 102 is realized by the CPU, the storage unit 105 stores the program or data executed by the CPU. The storage unit 105 is configured by storage devices such as a RAM (Random Access Memory), a flash memory, an HDD (Hard Disk Drive), and an SSD (Solid State Drive).

The sensor unit 106 is connected to various sensors through the I/O unit 91, which is a connector, and detects a posture of the HMD 1 (that is, a posture of the user, an orientation of a head of the user), the movement, an ambient temperature, etc. based on signals detected by the various sensors. As various sensors, for example, a tilt sensor, an acceleration sensor, a temperature sensor, a GPS (Global Positioning System) sensor that detects the position information of the user, etc. are connected to the sensing unit 106.

The communication unit 107 communicates with an external information processing device by short-range wireless communication, long-range wireless communication, or wired communication through the I/O unit 92, which is a connector. Specifically, the communication unit 107 performs communication by Bluetooth (registered trademark), Wi-Fi (registered trademark), a mobile communication network, a universal serial bus (USB, registered trademark), a high-definition multi-media interface (HDMI (registered trademark)), etc.

The voice processing unit 108 is connected to an I/O device such as a microphone, earphones, or a speaker through the I/O unit 93 which is a connector to input or output an audio signal. The imaging unit 109 is, for example, a small camera or a small TOF (Time Of Flight) sensor that captures a user's viewing direction of the HMD 1.

FIG. 1B is a diagram showing an example of a hardware configuration of the HMD 1. As shown in FIG. 1B, the HMD 1 includes a CPU 201, a system bus 202, a ROM (Read Only Memory) 203, a RAM 204, a storage 210, a communication processor 220, a power supply 230, a video processor 240, an audio processor 250, and a sensor 260.

The CPU 201 is a microprocessor unit that controls the entire HMD 1. The CPU 201 corresponds to the control unit 102. The system bus 202 is a data communication channel for transmitting and receiving data between the CPU 201 and each operation block in the HMD 1.

The ROM 203 is a memory in which a basic operation program such as an operating system and other operation programs are stored. For example, a rewritable ROM such as EEPROM (Electrically Erasable Programmable Read-Only Memory) or flash ROM can be used as the ROM 203.

The RAM 204 serves as a work area when the basic operation program and other operation programs are executed. The ROM 203 and the RAM 204 may be integrated with the CPU 201. The ROM 203 has no independent configuration as shown in FIG. 1B, but may use some storage area in the storage 210.

The storage 210 stores the operation program and an operation setting value of the information processing device 100, personal information 210a of the user who uses the HMD 1, and the like. Although not particularly illustrated below, the storage 210 may store the operation program downloaded from the network and various data created by the downloaded program. Also, a part of the storage area of the storage 210 may be replaced with some or all the functions of the ROM 203. The storage 210 may be used with, for example, a device such as a flash ROM, an SSD, or an HDD. The ROM 203, the RAM 204, and the storage 210 correspond to the storage unit 105. The above operation program stored in the ROM 203 and the storage 210 is downloaded from each device on the network, so that the above operation program can be updated and functionally expanded.

The communication processor 220 includes a LAN (Local Area Network) communication device 221, a telephone network communication device 222, an NFC (Near Field Communication) communication device 223, and a BlueTooth communication device 224. The communication processor 220 corresponds to the communication unit 107. In FIG. 1B, the case where the communication processor 220 includes the LAN communication device 221, the NFC communication device 223, and the BlueTooth communication device 224 is illustrated, but as described in FIG. 1A, those communication devices may be connected as an external device of the HMD 1 through the I/O unit 92. The LAN communication device 221 is connected to the network through an access point and transmits and receives data to/from the device on the network. The NFC communication device 223 wirelessly communicates to transmit and receive data when a corresponding leader or writer is close to the NFC communication device 223. The BlueTooth communication device 224 wirelessly communicates with a nearby information processing device to transmit and receive data. The HMD1 may include a telephone network communication device 222 that transmits and receives calls and data to and from the base station of the mobile telephone communication network.

The virtual image generation mechanism 225 includes an image display unit 120, a projection unit 121, a first light guide plate 122, and a second light guide plate 123. The virtual image generation mechanism 225 corresponds to the virtual image generation unit 101. A specific configuration of the virtual image generation mechanism 225 will be described later with reference to FIG. 2.

The power supply 230 is a power supply that supplies power to the HMD 1 according to a predetermined standard. The power supply 230 corresponds to the power supply unit 104. In FIG. 1B, the case where the power supply 230 is included in the HMD 1 is illustrated, but the power supply 230 may be connected as an external device of the HMD 1 through any of the I/O units 91 to 93, and the HMD 1 may be supplied with power from the external device.

The video processor 240 includes a display 241, an image signal processing processor 242, and a camera 243. The video processor 240 corresponds to the image signal processing unit 103 and the virtual image generation unit 101. The camera 243 corresponds to the imaging unit 109, and the display 241 corresponds to the small display unit described above. FIG. 1B illustrates the case where the video processor 240 includes the display 241 and the camera 243. However, as described in FIG. 1A, the display 241 and the camera 243 may be connected as the external devices of the HMD 1 through the I/O unit 93.

The display 241 is, for example, a display device such as a liquid crystal panel, and displays the image data processed by the image signal processing processor 242. The image signal processing processor 242 displays the input image data on the display 241. The camera 243 is a camera unit that functions as an imaging device that receives image data of surroundings and objects by converting light input from a lens into an electrical signal with the use of an electronic device such as a CCD (Charge Coupled Device) or CMOS (Complementary Metal Oxide Semiconductor) sensor.

The audio processor 250 includes a speaker 251, an audio signal processor 252, and a microphone 253. The audio processor 250 corresponds to the voice processing unit 108. In FIG. 1B, the case where the audio processor 250 includes the speaker 251 and the microphone 253 is illustrated, but as described in FIG. 1A, the speaker 251 and the microphone 253 may be connected as an external device of the HMD 1 through the I/O unit 93.

The speaker 251 outputs an audio signal processed by the audio signal processor 252. The audio signal processor 252 outputs the input voice data to the speaker 251. The microphone 253 converts voice into voice data and outputs the voice data to the audio signal processor 252.

The sensor 260 is a group of sensors for detecting the state of the information processing device 100, and includes a GPS receiver 261, a gyro sensor 262, a geomagnetic sensor 263, an acceleration sensor 264, an illuminance sensor 265, and a proximity sensor 266. The sensor 260 corresponds to the sensing unit 106. In FIG. 1B, the case where the sensor 260 includes a GPS receiver 261, a gyro sensor 262, a geomagnetic sensor 263, an acceleration sensor 264, an illuminance sensor 265 and a proximity sensor 266 is illustrated, but as described in FIG. 1A, those components may be connected as an external device of the HMD 1 through the I/O unit 91. Since each sensor is a group of general sensors that have been known up to now, their description will be omitted. The configuration of the HMD 1 shown in FIG. 1B is just an example, and may not always necessarily have all of those components.

FIG. 2 is a block configuration diagram of the virtual image generation unit 101 in this example. The virtual image generation unit 101 includes an image display unit 120, a projection unit 121, a first light guide plate 122, and a second light guide plate 123. The image display unit 120 is a device that generates an image to be displayed, and irradiates a built-in small display unit (not shown) with light from a light source such as an LED or a laser. The small display unit is an element that displays an image, and is formed of a liquid crystal display, a digital micro-mirror device, an organic EL display, a MEMS (Micro Electro Mechanical Systems), and a fiber scanning device. The projection unit 121 is a device that enlarges image light of the image display unit 120, and projects the image light as a virtual image. The first light guide plate 122 duplicates the image light for enlarging the eye box. The second light guide plate 123 duplicates the image light for enlarging the eye box in a direction different from that of the first light guide plate 122, and transmits the image light from the projection unit 121 and the first light guide plate 122 to a pupil 20 of the user. The user can visually recognize the image by forming the image light on a retina in the pupil 20.

Figure 3:
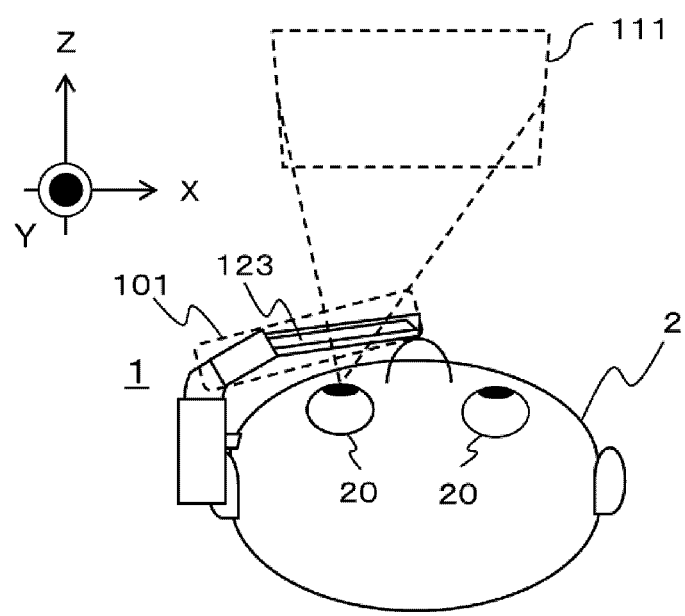
FIG. 3 is a diagram showing a usage pattern of the HMD in Example 1.

FIG. 3 is a diagram showing a usage pattern of the HMD 1 in this example. FIG. 3 shows a state of looking down from an overhead direction of a user 2, the X-axis is a horizontal direction, the Y-axis is a vertical direction, and the Z-axis is a visual axis direction, which is a direction of the line of sight of the user 2. In the following drawings, the directions of the X, Y, and Z axes are defined in the same way.

The HMD 1 is worn to a head of the user 2, and propagates the image generated by the virtual image generation unit 101 to the pupil 20 of the user through the second light guide plate 123. At that time, the user 2 can visually recognize the image (virtual image) in an image display area 111 of a part of the field of view in a state where the outside world can be seen (see-through type). Although the configuration in which the image is displayed in one eye is shown in FIG. 3, a configuration in the image is displayed in both eyes is also acceptable. The HMD 1 can also capture a viewing range of the user 2 with the imaging unit 109 in FIG. 1.

Figure 4A:
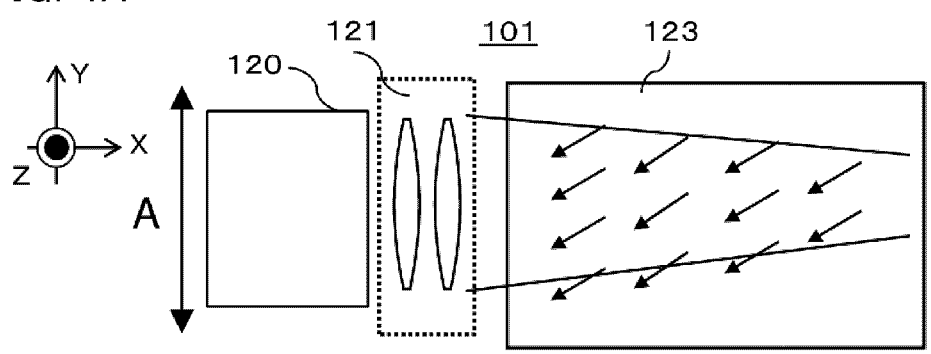
FIGS. 4A and 4B are configuration diagrams of a conventional virtual image generation unit.
Figure 4B:
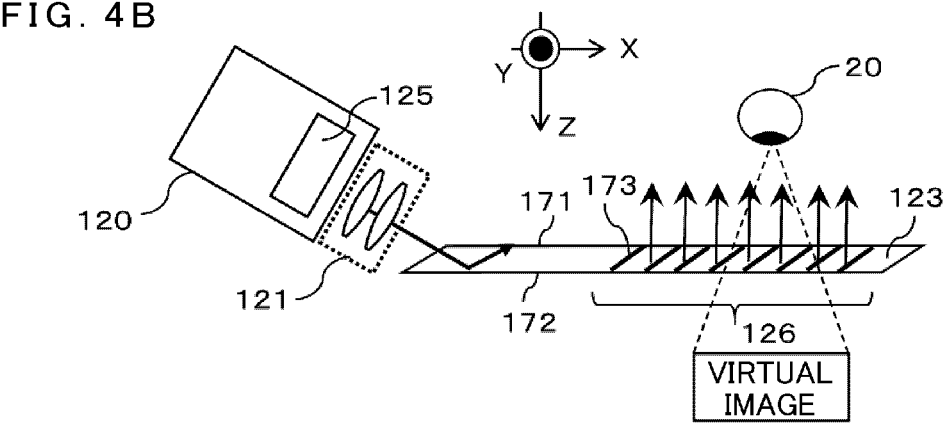

Next, a conventional configuration diagram of the virtual image generation unit 101 using the mirror array type light guide plate 123 is shown in FIGS. 4A and 4B. In FIGS. 4A and 4B, FIG. 4A shows the virtual image generation unit 101 viewed from the Z-axis direction, which is the visual axis direction. FIG. 4B shows the virtual image generation unit 101 viewed from the Y-axis direction, which is the vertical direction. The second light guide plate 123 internally includes emission reflective surfaces 173, which are flat surfaces having two main parallel planes 171 and 172, and which are at least two or more partial reflective surfaces in order to enlarge the eye box. The second light guide plate 123 has a function of duplicating the image light of the projection unit 121 in the X-axis direction by the emission reflective surface 173 having a reflective film which reflects a part of the image light. In addition, it is desirable that the emission reflective surfaces 173 are approximately parallel to each other so as not to cause an angular deviation in the reflected image light.

It is desirable that the eye box formed by the virtual image generation unit 101 is enlarged in the two-dimensional direction from the viewpoint of practicality. Since the second light guide plate 123 is the eye box enlargement only in the horizontal direction, an optical engine needs to input the image light with a large optical beam diameter in the vertical direction. Therefore, it is necessary to reduce an F value of the optical system of the image display unit 120 in the vertical direction. A dimension A portion of the image display unit 120 and the projection unit 121 in FIG. 4A becomes larger, and the virtual image generation unit 101 becomes larger. Due to the characteristics of the HMD as a device that can be worn and used, weight and appearance design are also important factors, which are important points to increase the commercial value.

In this way, the HMD has problems in achieving both two-dimensional enlargement and miniaturization of the eye box. The solutions to those problems will be described below.

Figure 5A:
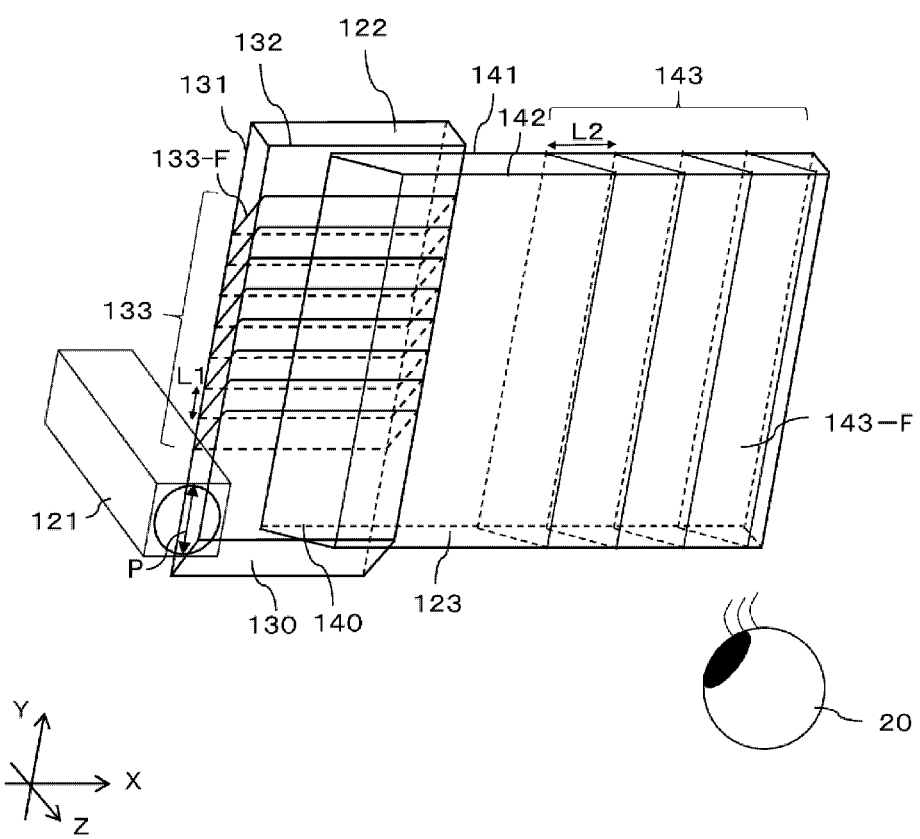
FIG. 5A is a configuration diagram of first and second light guide plates in Example 1.
Figure 5B:
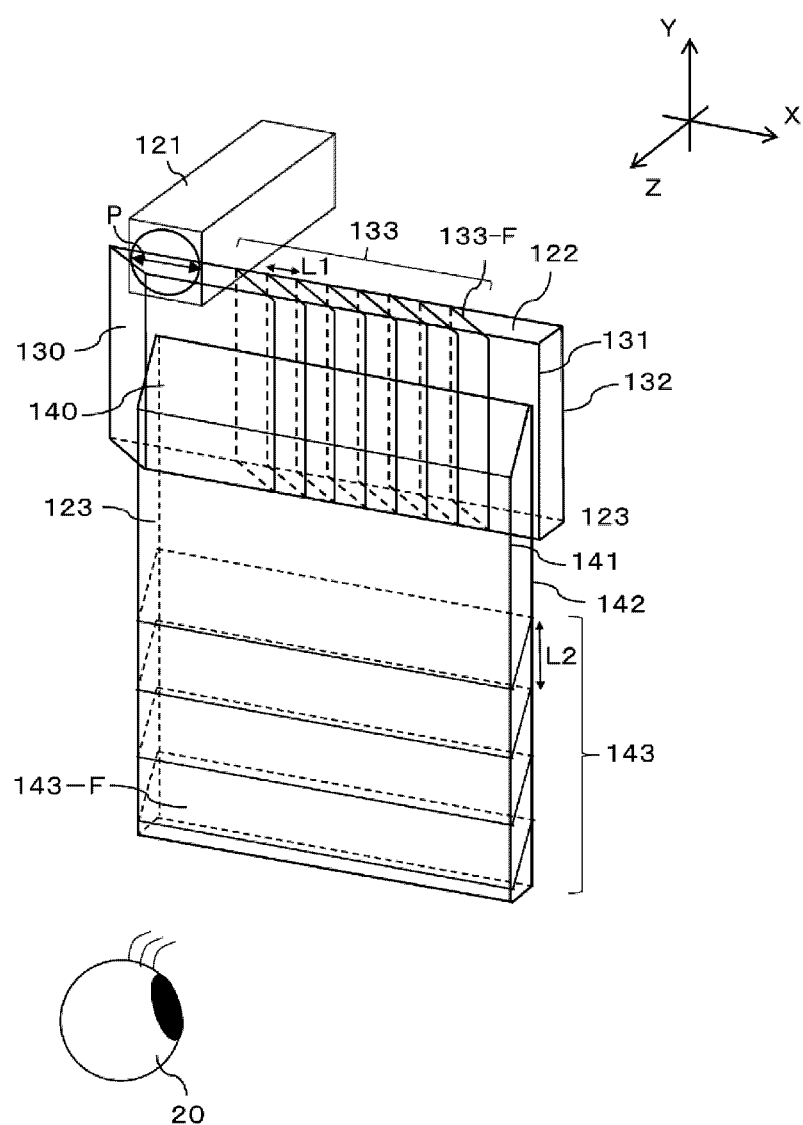
FIG. 5B is a configuration diagram of the first and second light guide plates in Example 1.

FIGS. 5A and 5B are configuration diagrams of the virtual image generation unit 101 in this example. In FIGS. 5A and 5B, the same configurations as those in FIGS. 4A and 4B are designated by the same reference numerals, and the description thereof will be omitted. FIGS. 5A and 5B show the case where the virtual image generation unit 101 is placed on a temporal side and the case where the virtual image generation unit 101 is placed on a parietal side, respectively. In this example, the first light guide plate 122 solves the above-mentioned problem. As described above, it is desirable that the eye box formed by the virtual image generation unit 101 is enlarged in the two-dimensional direction from the viewpoint of image visibility. In order to enlarge the eye box in two dimensions, the first light guide plate 122 enlarges the eye box in the vertical direction in FIG. 5A, and enlarges the eye box in the horizontal direction in FIG. 5B. The first light guide plate 122 internally includes two or more emission reflective surfaces 133 that emit the image light to the outside of the first light guide plate, which is shaped in a flat plate having an incident surface 130 that reflects the image light into the inside of the first light guide plate 122 and two main parallel planes 131 and 132 that confine the image light by total reflection, which is an internal reflection. A distance between adjacent mirrors of the emission reflective surfaces 133 is defined as L1. The second light guide plate 123 internally includes two or more emission reflective surfaces 143 (output unit) that emit the image light to the outside of the second light guide plate, which is shaped in a flat plate having an incident surface 140 (input unit) that reflects the image light into the inside of the second light guide plate 123 and two main parallel planes 141 and 142 that confine the image light by total reflection. A distance between adjacent mirrors of the emission reflective surfaces 143 is defined as L2. The second light guide plate 123 emits the image toward the pupil 20 of the user. As described above, in the virtual image generation unit 101 in this example, the first light guide plate 122 and the second light guide plate 123 each have a set of parallel main surfaces that confine the image light by internal reflection, and the first light guide plate 122 includes the incident surface that reflects the image light inward, and two or more emission reflective surfaces that emits the image light to the second light guide plate 123. The incident surface and the emission reflective surface are parallel to each other and at different angles from the main surface, and the second light guide plate 123 includes the input unit that combines the image light from the first light guide plate 122 inward, and the output unit that emits the image light to the pupil 20 of the user.

The following exemplifies the case where the internal reflection is total reflection by two parallel planes. However, the internal reflection does not necessarily have to be total reflection; for example, a light guide plate having parallel planes that cause specular reflection or diffuse reflection by attaching a film made of a material that transmits or reflects the light onto some or all of the parallel planes of the light guide plate configuring those parallel planes may be used.

The emission reflective surfaces 133 of the first light guide plate 122 and the emission reflective surfaces 143 of the second light guide plate 123 are partial reflective surfaces that reflect a part of the light and transmit or absorb the remaining light. The partial reflective surfaces are arranged in an array. An array direction of the emission reflective surfaces 133 of the first light guide plate 122 and an array direction of the emission reflective surfaces 143 of the second light guide plate 123 are different to realize the enlargement of the eye box in the two-dimensional direction. Therefore, the lens aperture of the image display unit 120 and the projection unit 121 can be reduced (the F value can be increased), and the virtual image generation unit 101 can be significantly reduced in size.

Figure 6A:
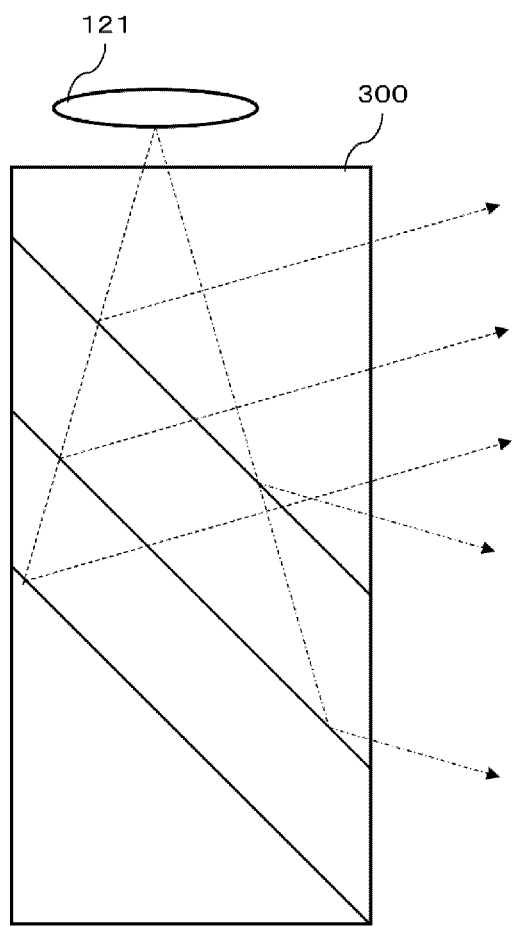
FIGS. 6A and 6B are comparative configuration diagrams of an image light duplication unit without light confinement and a first light guide plate in Example 1.
Figure 6B:
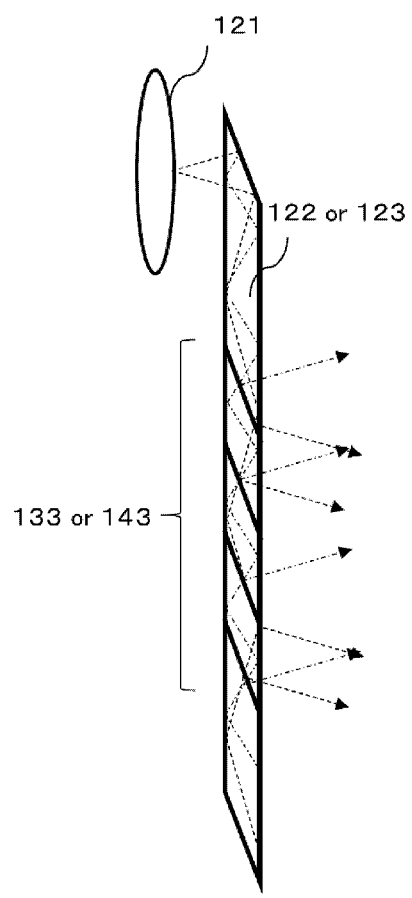

FIG. 6A shows an example of the image light duplication element 300 having no total reflection confinement function. There is a problem that in order to prevent a light beam emitted from the projection unit 121 at a predetermined angle of view from causing stray light generation on the side surface of the image light duplication element 300, an outer shape of the image light duplication element 300 becomes large. FIG. 6B illustrates the case of the first light guide plate 122 or the second light guide plate 123, which has an advantage that while the size of the element is reduced to confine the image light by total reflection, the image light can be duplicated and the eye box can be enlarged.

From the viewpoint of image quality, it is desirable that the emission reflective surfaces 133 of the first light guide plate 122 are parallel to each other so that the reflected image light does not have an angular deviation. Similarly, it is desirable that the emission reflective surfaces 143 of the second light guide plate 123 are parallel to each other. When the parallelism is lowered, a light beam angle after reflection from the emission reflective surfaces 133 or 143 differs for each reflective surface, causing stray light and deteriorating the image quality.

In addition, if the incident surface 130 of the first light guide plate 122 and the emission reflective surfaces 133 are also parallel to each other, a working process can be simplified and the manufacturing cost can be reduced. As a result, the flat plates on which each reflective film is formed are stacked, integrated with adhesive and cut out, thereby making it possible to process from the incident surface to the emission reflective surface at once, and to cut out the multiple first light guide plates. If the angles of the incident surface 130 are different from each other, it is necessary to form the incident surface after a step of cutting out the light guide plate and further cutting out the incident surface. Similarly, the incident reflective surface 140 of the second light guide plate 123 and the emission reflective surfaces 143 are brought in parallel to each other, thereby making it possible to simplify processing and suppress the costs.

From the viewpoint of stray light, it is desirable that the image light reflected from the emission reflective surfaces 133 of the first light guide plate 122 may be emitted to the outside of the first light guide plate 122 at a critical angle or less with respect to the main parallel planes 131 and 132. If the image light reflected from the emission reflective surfaces 133 has a component exceeding the critical angle and propagates inside due to a confinement action of the light guide plate even after reflection, the propagated light is reflected again by the emission reflective surfaces 133 and output to the second light guide plate, and the light becomes stray light. Similarly, from the viewpoint of avoiding stray light, it is desirable that the image light reflected from the emission reflective surfaces 143 of the second light guide plate 123 has the critical angle or less at all angles of view with respect to the main parallel planes 141 and 142, and is emitted to the outside of the second light guide plate 123.

Figure 7:
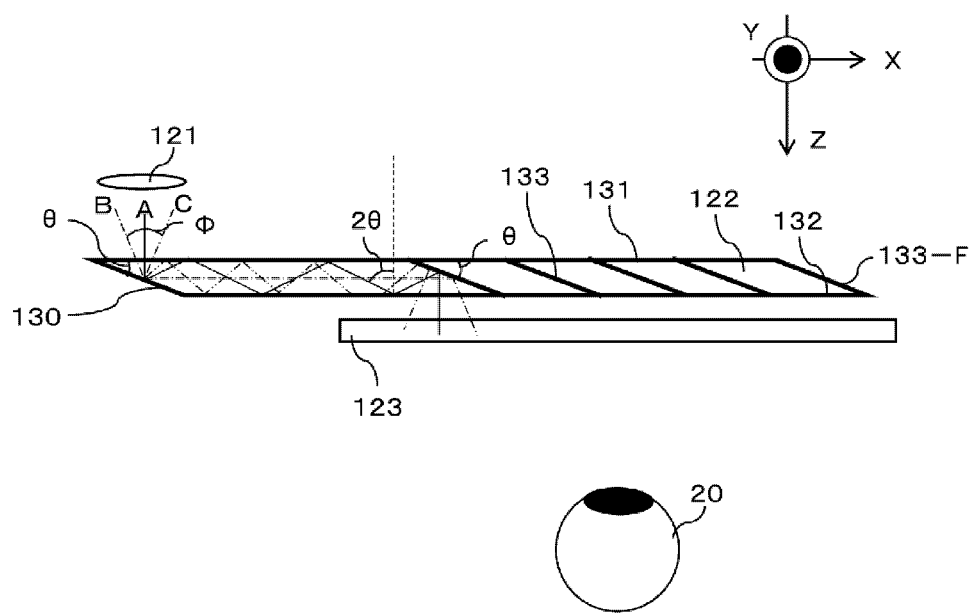
FIG. 7 shows a modification of the first and second light guide plates in Example 1.

A more detailed geometric condition of a tilt angle $\theta$ of the emission reflective surface and a total reflection critical angle will be described. The emission reflective surface 133 has a predetermined tilt angle $\theta$ to change the direction so as to emit the image light to the outside of the light guide plate with respect to the main surfaces 131 and 132 which are parallel planes. In FIG. 7, a solid line (A) represents a light beam at the center of the angle of view, and a one-dot chain line (B) and a two-dot chain line (C) represent the respective light beams at the edge of the angle of view. The light beam B at the center of the angle of view needs to travel at an incident angle $2\theta$ with respect to the parallel planes 131 and 132 after being reflected by the incident surface 130. Also, considering a refraction of the light beams B and C on the incident surface 130, an angle of incidence on the planes 131 and 132 within the light guide plate falls within $2\theta \pm \arcsin[\sin(\Phi/2)/n]$. From the viewpoint of avoiding stray light, the light beam B needs to satisfy $2\theta + \arcsin[\sin(\Phi/2)/n] < 90°$ or less. Also, in order to satisfy a total reflection condition, the light beam C needs to satisfy $2\theta - \arcsin[\sin(\Phi/2)/n] <$ critical angle or less. "n" is a refractive index of a substrate. Normally, n is about 1.5, and when displaying a field angle of about $\Phi 30°$, the tilt angle $\theta$ between the incident surface 130 and the emission surface group 133 is in a range of 16° to 40°.

The same condition must be satisfied for the second light guide plate, and the tilt angle $\theta$ between the incident reflective surface 140 and the emission reflective surfaces 143 is in the range of 16° to 40°.

As described above, as shown in FIGS. 5A and 5B, in the first light guide plate 122 and the second light guide plate 123, the second light guide plate 123 receive the image light emitted from the first light guide plate 122, so that the main surfaces 131 and 132 of the first light guide plate and the main surfaces 141 and 142 of the second light guide plate are in different planes, and the main surfaces 131 and 132 of the first light guide plate are disposed to be closer to the projection unit 121 than the main surfaces 141 and 142 of the second light guide plate, and the respective two main parallel planes 131, 132 and 141, 142 are disposed in parallel. Also, in order for the incident reflective surface 140 of the second light guide plate to efficiently receive the image light emitted from the main surface 131 of the first light guide plate, the first light guide plate 122 and the second light guide plate 123 need to be close to each other.

The image light in the first light guide plate 122 is gradually reflected by the partial reflective surface of the emission reflective surfaces 133 and travels inside while reducing the amount of light, and finally all the images are output to the second light guide plate 123 on a final surface 133-F of the emission reflective surfaces 133. As a result, the efficiency can be improved. Therefore, it is desirable that the reflectance of the final surface 133-F is not partial reflection but approximately 100% as in a normal mirror. The partial reflective surface of the emission reflective surfaces 133 is configured so that the reflectance gradually increases from a side closer to the incident surface. As a result, the uniformity of the amount of image light in the eye box is improved.

Since the second light guide plate maintains the see-through property as a head mounted display, the reflectance of the emission reflective surfaces 143 is lower than the reflectance of the emission reflective surfaces 133. Since the reflectance is low, the reflectance of the emission reflective surfaces 143 does not cause a large brightness blur even if the reflectance is all the same (same reflective film), but rather the second light guide plate can be processed in the same film formation process and the manufacturing cost can be reduced.

On the other hand, when the light utilization efficiency is emphasized rather than the see-through property and the reflectance is set to be high, the reflective film of the emission reflective surfaces 143 may gradually increase the reflectance from a side closer to the incident surface and the uniformity of light intensity of the image light within the eye box may be enhanced to improve the image quality.

When the distance L1 between the adjacent mirrors of the emission reflective surfaces 133 of the first light guide plate 122 and the distance L2 between the adjacent mirrors of the emission reflective surfaces 143 of the second light guide plate 123 are wider than an aperture P of the projection lens emission unit, overlap between the adjacent duplicate image light beams is insufficient and an eye box area with a small amount of image light is generated. Therefore, the distances L1 and L2 of the adjacent reflective surfaces are set to be smaller than the aperture P of the projection unit 121 to improve the brightness uniformity in the eye box and visual image.

Figure 8A:
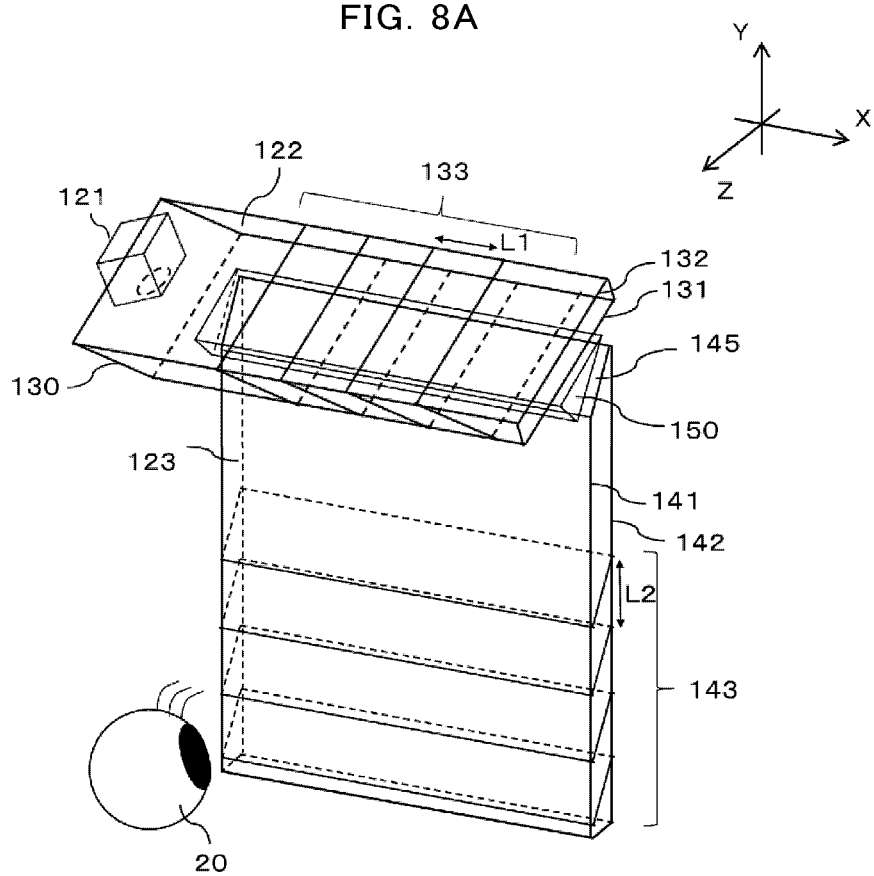
FIGS. 8A and 8B are schematic diagrams showing a light beam propagation in the first and second light guide plates in Example 1.
Figure 8B:
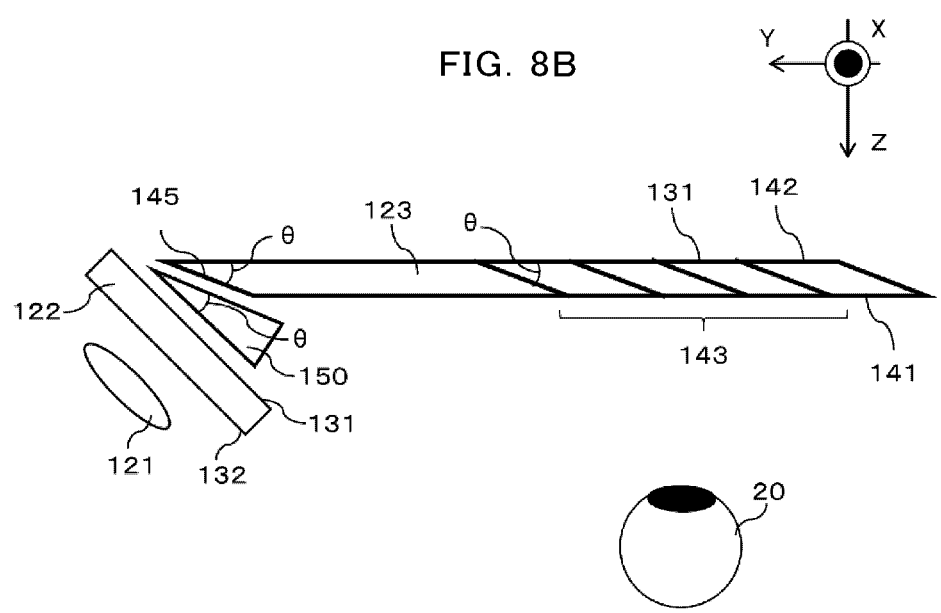

FIGS. 8A and 8B are configuration diagrams of a modification in which the incident reflective surface 140 of the second light guide plate 123 is not a reflective surface but an incident transmission surface 145. As shown in FIG. 8A, the image light emitted from the first light guide plate 122 is input to the incident transmission surface 145 of the second light guide plate 123 through an optical path correction prism 150. A width of the first light guide plate projected on the Y axis can be reduced, and a portion corresponding to the A dimension can be apparently reduced and the design is improved.

As described above, the incident transmission surface 145 and the partial reflective surface group 143 are parallel to each other in terms of processing simplification, and the tilt angle with respect to the main surface is θ. While a light beam angle is changed by 2θ with respect to the tilt angle θ on the emission reflective surface side, the light beam angle is changed by θ on the incident transmission surface, which causes distortion in the image. Therefore, as shown in FIG. 8B, an optical path is corrected by an optical path correction prism 150 whose apex angle has the same θ as the tilt angle. Therefore, in FIGS. 8A and 8B, the main surface of the first light guide plate 122 is disposed at an angle of 2θ with respect to the main surface of the second light guide plate 123. As described above, the tilt angle θ is in the range of 16° to 40° from the viewpoint of stray light.

The HMD is highly required for the design of a glass shape. In the configuration shown in FIGS. 8A and 8B, the image display unit 120 and the projection unit 121 are tilted together with the first light guide plate 122 so that the image display unit 120 and the projection unit 121 can be placed between the light guide plate and the pupil 20 of the user. This also leads to the advantage that the HMD can be easily designed in the shape of glasses.

In the above, the configuration using the mirror array for the first light guide plate 122 and the second light guide plate 123 has been described, but the eye box may be enlarged with the light guide plates using different methods. For example, FIG. 9 shows an example of a light guide plate using a diffraction grating or a volume hologram for the light guide plate. The second light guide plate 123 is provided with an input unit 146 instead of the incident reflective surface 140. The input unit 146 is a surface relief diffraction grating or a volume hologram, which deflects a traveling direction of the input image light and guides the image light to the inside of the light guide plate. Similarly, a surface relief diffraction grating and a volume hologram are formed on an output unit 147, and a part of the image light propagated in the light guide plate is deflected to the pupil 20 so that the image display is realized while enlarging the eye box. The surface relief diffraction grating and the volume hologram of the output unit 147 are designed to reduce the diffraction efficiency with respect to the light of the outside world so that the second light guide plate has a see-through property.

As described above, according to this example, there can be provided the HMD that achieves both the miniaturization of the optical system and the enlargement of the eye box.

Example 2

Figure 10:
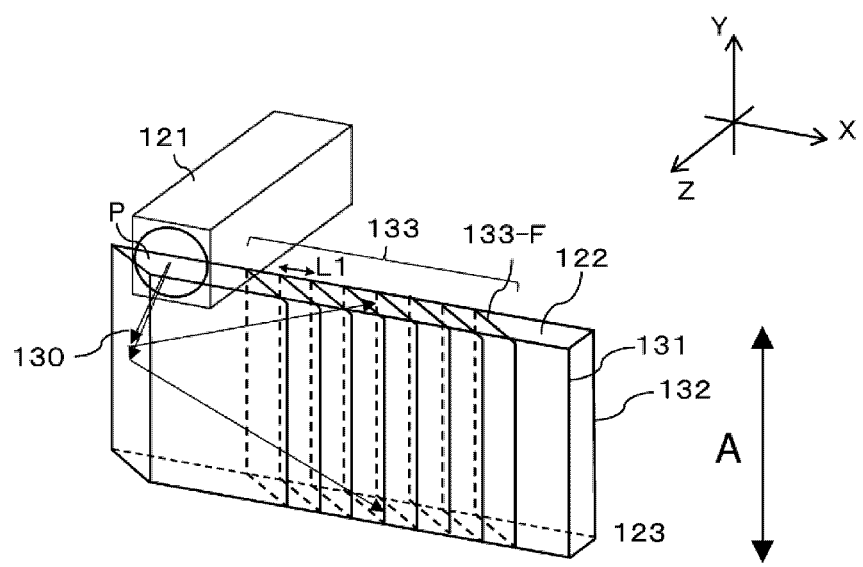
FIG. 10 is a schematic diagram of a technical problem of the first light guide plate in Example 1.

FIG. 10 shows an optical path by arrows when the light guide plate in Example 1 is combined with the projection unit 121 that displays an image with a wide angle of view. In the configuration of Example 1, the projection unit 121 enters the image light from a position away from a center position of the second light guide plate (a position far from the pupil). Therefore, when the image light with a wide angle of view is input, the image light hits an end surface of the first light guide plate 122 and is obscured before reaching the final surface 133-F of the emission reflective surfaces 133 from the incident surface 130. As a result, a sufficient eye box enlargement effect cannot be obtained. When the image light is avoided from being obscured, the Y-axis direction of the light guide plate increases in the arrangement shown in FIG. 10, and the vertical A dimension of the HMD is increased and the designability as a wearable device is reduced.

Figure 11B:
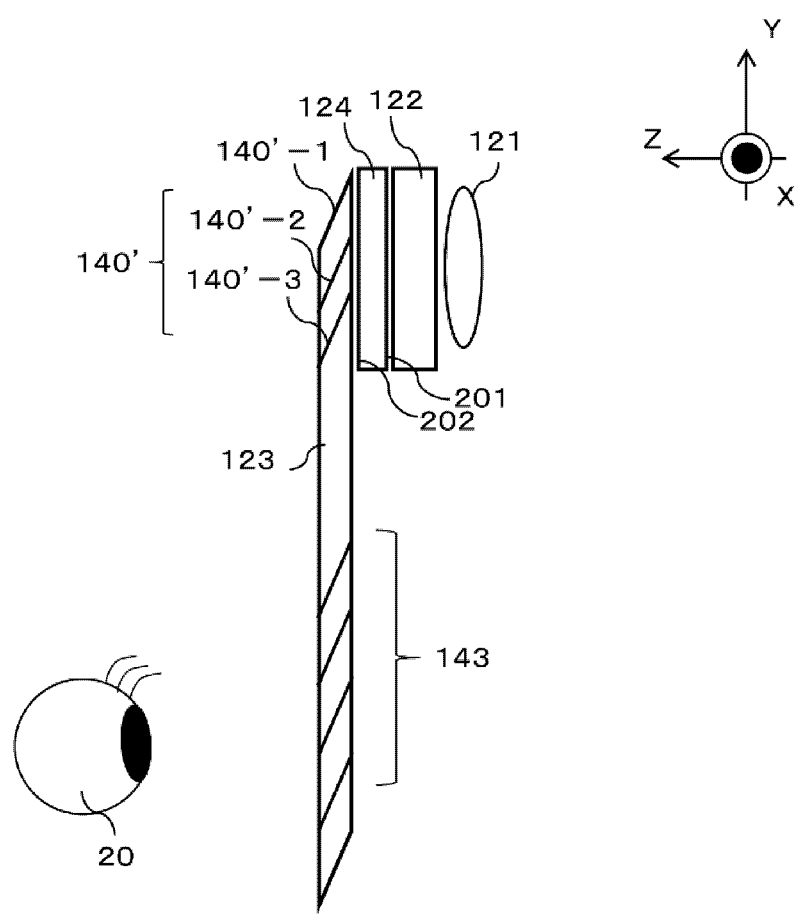
FIG. 11B is a configuration diagram of the first, second, and third light guide plates in Example 2.
Figure 11C:
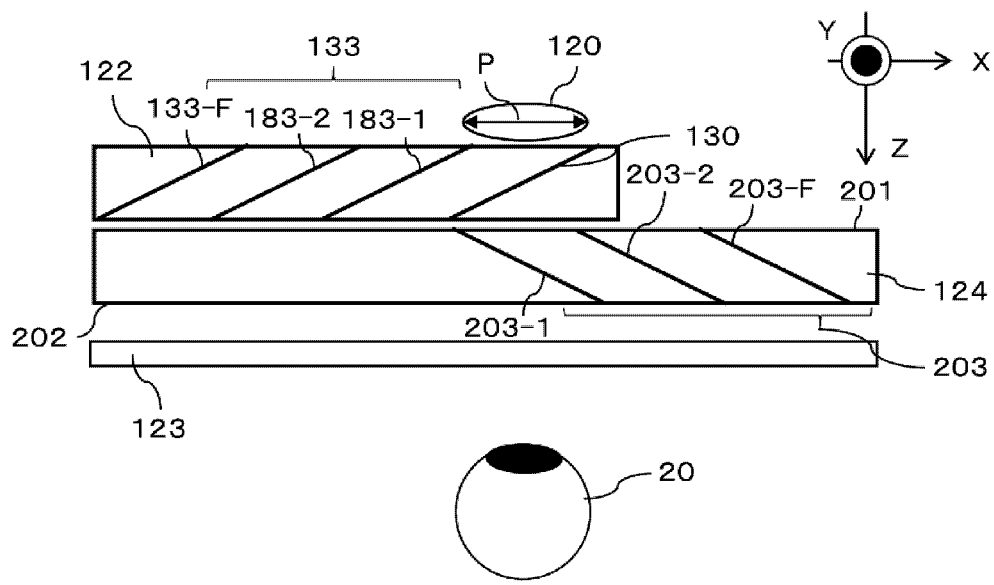
FIG. 11C is a configuration diagram of the first, second, and third light guide plates in Example 2.

FIGS. 11A to 11C are configuration diagrams of the light guide plate in this example. In FIGS. 11A to 11C, the same configurations as those in FIGS. 5A and 5B are designated by the same reference numerals, and a description thereof will be omitted. A difference of FIGS. 11A to 11C from FIGS. 5A and 5B resides in that a third light guide plate 124 is provided between the first light guide plate 122 and the second light guide plate 123. The third light guide plate 124 enlarges the eye box together with the first light guide plate 122.

The third light guide plate 124 is in the form of a flat plate having two main parallel planes 201 and 202 that confine the image light by total reflection, and includes two or more emission reflective surfaces 203 that reflect the image light from the first light guide plate into the third light guide plate and emits the image light from the first light guide plate to the outside of the third light guide plate. A reflective surface 203-1 of the emission reflective surfaces 203, which is the closest to the projection unit 121, reflects a part of the image light and transmits the remaining image light. The image light reflected by the reflective surface 203-1 is confined by the two main parallel planes 201 and 202 by total reflection, and propagates in the third light guide plate while reflecting a part of the light by a partial reflective surface of the emission reflective surfaces 203. A final reflective surface 203-F of the emission reflective surfaces 203 is a reflective surface with a reflectance close to 100%. Each reflective surface of the emission reflective surfaces 203 is made substantially parallel to each other so that the image quality can be enhanced as in the first light guide plate.

With provision of the third light guide plate 124, the projection unit 121 can enter the image light from the substantially central position (position close to the pupil) of the second light guide plate 123, and a distance from the incident surface 130 of the first light guide plate 122 to the final surface 133-F of the emission reflective surface 133 is reduced to about half of the previous one, and the first light guide plate 122 can be miniaturized.

The first light guide plate 122 and the third light guide plate 124 may confine the image light in a range of about half of the screen to enlarge the eye box, and the direction axis of the third light guide plate 124 and the first light guide plate 122 for enlarging the eye box is the same and the image light travels in opposite directions. Therefore, a tilt angle of the emission reflective surface of the first light guide plate 122 and the reflective surface of the third light guide plate 124 is the same as the first light guide plate 122, and the tilt direction is reversed. Therefore, when the tilt angle of the emission reflective surface with respect to the main surface of the first light guide plate 122 is a predetermined angle θ, the tilt angle of the emission reflective surface with respect to the main surface of the third light guide plate 124 is a predetermined angle −θ.

The tilt angles θ of the emission reflective surfaces of the first light guide plate 122 and the third light guide plate 124 are in the range of 16° to 40° as in Example 1, taking into consideration the conditions for avoiding a total reflection critical angle and an inverted image due to total reflection, and the conditions for emitting light while breaking the critical angle from the light guide plate after the emission surface reflection. In the geometrical arrangement of the first light guide plate 122 to the third light guide plate 124 from the projection unit 121 to the pupil 20 of the user, the main surfaces of the first light guide plate 122, the second light guide plate 123, and the third light guide plate 124 are substantially parallel to each other, the main surface of the first light guide plate 122, the main surface of the second light guide plate 123, and the main surface of the third light guide plate 124 are in different planes, the main surface of the third light guide plate 124 is disposed closer to the projection unit 121 than the main surface of the second light guide plate 122, and the main surface of the first light guide plate 122 is disposed closer to the projection unit 121 than the main surface of the third light guide plate 124.

Correspondence to the image light with a wide angle of view by the third light guide plate 124 has the following advantages. Normally, in order to confine the image light with the wide angle of view in the light guide plate, it is necessary to make the substrate material high in refractive angle and to reduce the total reflection critical angle so that a range of light beam angles that can be confined is increased. However, in the configuration of this example, the first light guide plate 122 and the third light guide plate 124 do not need to confine the image light of the entire angle of view, and the image light with an angle of view in each of about half of the range has only to be confined to enlarge the eye box. As a result, it is not necessary to increase the refractive index of the substrate material, general-purpose materials can be used, and the manufacturing cost is reduced.

Next, the configuration of the second light guide plate 123 in this example will be described. As described above, the image light propagates in the first light guide plate 122 and the third light guide plate 124 with a spread according to the angle of view, and emits from the respective light guide plates. Therefore, the incident surface of the second light guide plate 123 that combines the image light beams from the first light guide plate 122 and the third light guide plate 124 cannot receive the image light unless the incident surface has a predetermined width. However, if the light guide plate is made thicker in order to increase an area of the incident surface 140 of the second light guide plate 123, an interval of total reflection of the image light confined inside becomes wider and the interval of emission of the duplicated image light becomes wider to generate brightness. In addition, the weight and manufacturing cost increase due to the increase in thickness.

As a method of increasing the coupling efficiency of the image light from the first light guide plate 122 and the third light guide plate 124 without increasing the thickness of the second light guide plate 123, there is a method of forming incident surfaces 140' provided with two or more incident surfaces. With the provision of the multiple incident surfaces, the effective area of the incident surfaces can be increased without increasing the thickness. FIG. 11B shows an example in which three incident surfaces of 140'-1 to 140'-3 are provided as the incident surfaces 140'. Further, even if the configuration of the incident surfaces 140' is used for the second light guide plate 123 shown in FIG. 5 of Example 1, the coupling efficiency of the image light in the peripheral portion of the angle of view can be similarly improved.

In order to maintain the image quality of the image light, it is desirable that the reflective surfaces of the incident surfaces 140' are parallel to each other. Also, the image light reflected from the incident surface 140'-1 does not need to pass through the incident surfaces 140'-2 and 140'-3. Therefore, the incident surface 140'-1 has a reflectance close to 100%, and the incident reflective surface closer to the pupil has a lower reflectance and a higher transmittance.

FIG. 11C shows the case where the reflective surface widths of the first light guide plate 122 and the third light guide plate 124 are larger than the aperture P of the projection unit 121. As a result, the image light from the projection unit 121 can be guided by the incident surface 130 (emission reflective surface 133-1 to emission reflective surface 133-F) and the emission reflective surfaces 203 (reflective surface 203-1 to reflective surface 203-F).

When the image display unit 120 is formed of a laser scanning type such as MEMS or fiber scanning device, the beam diameter is small and the diameter P of the projection unit is down to 2 mm, which is small, so that the thickness of the first light guide plate 122 and the third light guide plate 124 is also thin, and an increase in weight can be suppressed.

However, when a micro display is used for the image display unit 120, the aperture P of the projection unit 121 becomes a size of about 3 to 6 mm, and the thickness of the first light guide plate 122 and the third light guide plate 124 increases, resulting in problems in terms of the uniformity of a brightness distribution, and the weight.

Figure 12:
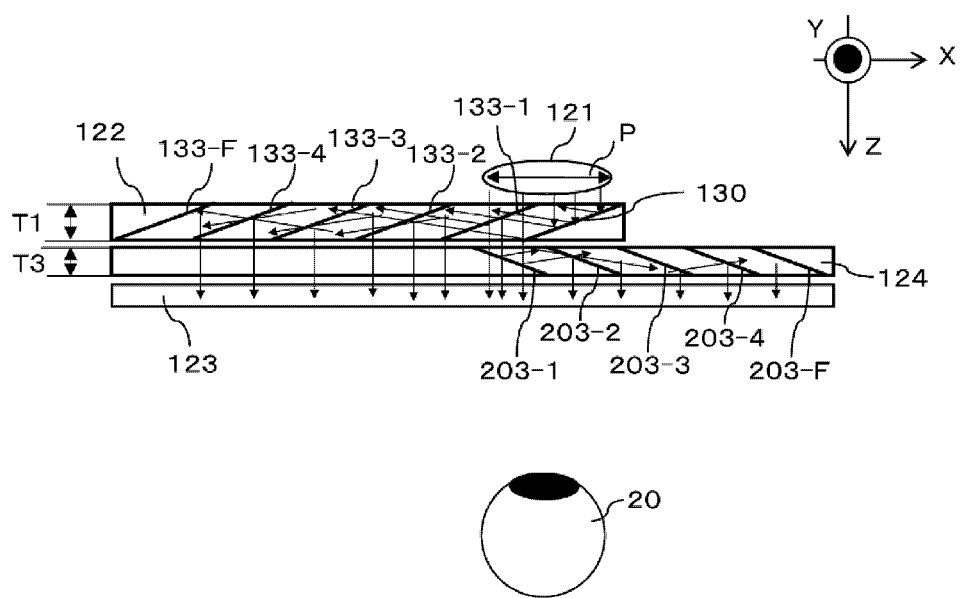
FIG. 12 shows a modification of the first, second, and third light guide plates in Example 2.

FIG. 12 shows a modification in which the first light guide plate 122 and the third light guide plate 124 are thinned. In FIG. 12, the reflection surface widths of the incident surface 130 of the first light guide plate 122 and the partial reflective surface 203-1 of the third light guide plate 124 are made smaller than the aperture P of the projection unit 121 to thin the first light guide plate 122 and the third light guide plate 124. Also, when the reflective surface widths of the incident surface 130 and the partial reflective surface 203-1 of the third light guide plate 124 are combined and made larger than the aperture P of the projection unit 121, and the image light from the projection unit 121 is guided to the inside of the first light guide plate 122 or the third light guide plate 124 with high efficiency without leakage.

A specific optical path of the image light will be described. The light reflected from the incident surface 130 and transmitted through the emission reflective surface 133-1 of the adjacent emission reflective surface group and the light reflected by the emission reflective surface 133-1 of the emission reflective surface group from the projection unit 121 is guided in the first light guide plate 122. On the other hand, the light transmitted from the projection unit 121 through the emission reflective surface 133-1 of the emission reflective surface group and the light reflected by the incident surface 130 and also reflected by the emission reflective surface 133-1 of the adjacent emission reflective surface group reflect the partial reflective surface 203-1 of the third light guide plate 124 and are guided within the third light guide plate 124. Therefore, the incident surface 130 and emission reflective surface 133-F, which is the final surface of the emission reflective surface, have an excellent reflectance close to 100%, and the other emission reflective surfaces 133-$n$ ($n$ is a number of 1 or more. The figure shows four reflective surfaces, but the number of reflective surfaces can be changed freely) are the partial reflective surfaces where both transmitted light and reflected light are generated. Of the partial reflective surfaces of the third light guide plate 124, the partial reflective surface 203-1 directly below the projection unit 121 receives the light reflected by the projection unit 121, the incident surface 130, and the emission reflective surface 133-1, and therefore is an area with a large amount of light. Therefore, it is necessary to set a high reflectance to suppress the amount of transmitted light, and the reflectance is preferably 80% or more. From the partial reflective surface 203-2 adjacent to the partial reflective surface 203-1 directly under the projection unit 121 of the third light guide plate 124 to the reflective surface 203-$n$ ($n$ is an integer. In the figure, n=4) one before the partial reflective surface 203-F, when the reflectance is gradually increased, the light amount distribution of the output image light becomes uniform, and the brightness distribution of the projected image improves. The final surface 203-F of the partial reflective surface of the third light guide plate 124 outputs light to the second light guide plate 123 without leakage with a reflectance close to 100%.

According to the present inventors' study, after a part of the image light is taken into the first light guide plate 122 in the foreground, the third light guide plate 124 on a side far from the projection unit 121 takes in the image light, so that unevenness is likely to occur in the output light distribution after the enlargement of the eye box. Therefore, a thickness T3 of the third light guide plate 124 is set to be thinner than a thickness T1 of the first light guide plate 122 to reduce a placement interval of the emission reflective surfaces in the third light guide plate 124 and a total reflection period of the image light, and a duplication interval of the image light is shortened to uniform an output light distribution. As a result, the image quality of the visual image can be improved.

As described above, even when image light having a wide angle of view is incident with the configuration shown in this example, a high-quality image can be displayed by enlarging the eye box while suppressing an increase in the size of the light guide plate.

Therefore, according to this example, there can be provided an HMD that achieves both the miniaturization of the optical system and the enlargement of the eye box while realizing an image display with a wide angle of view.

Example 3

In this example, an application example of the HMD described in each example will be described. FIG. 13 is a diagram showing a usage example of the HMD in this example.

In FIG. 13, a content is displayed in the image (virtual image) display area 111 from the HMD 1 in the field of view of the user 2. For example, a work procedure manual 201 and a drawing 202 in the inspection and assembly of industrial equipment are displayed. Since the image display area 111 is limited, if the work procedure manual 201 and the drawing 202 are displayed at the same time, the content becomes smaller and the visibility deteriorates. Therefore, head tracking is performed to detect a direction of the head of the user 2 with an accelerometer, and the display content is changed according to the direction of the head so that visibility can be improved. In other words, in FIG. 13, the work procedure manual 201 is displayed in the image display area 111 with the user 2 facing left, but if the user turns to the right, the drawing 202 is displayed in the image display area 111, and the image display area 111 can be displayed as if there were a virtual image display area 112 in which the work procedure manual 201 and the drawing 202 can be visually recognized in a wide field of view.

As a result, the visibility is improved, and the user 2 can execute the work while simultaneously visually recognizing a work object (equipment, tool, etc.) and a work instruction, so that the work can be performed more reliably, and mistakes can be reduced.

Figure 14:
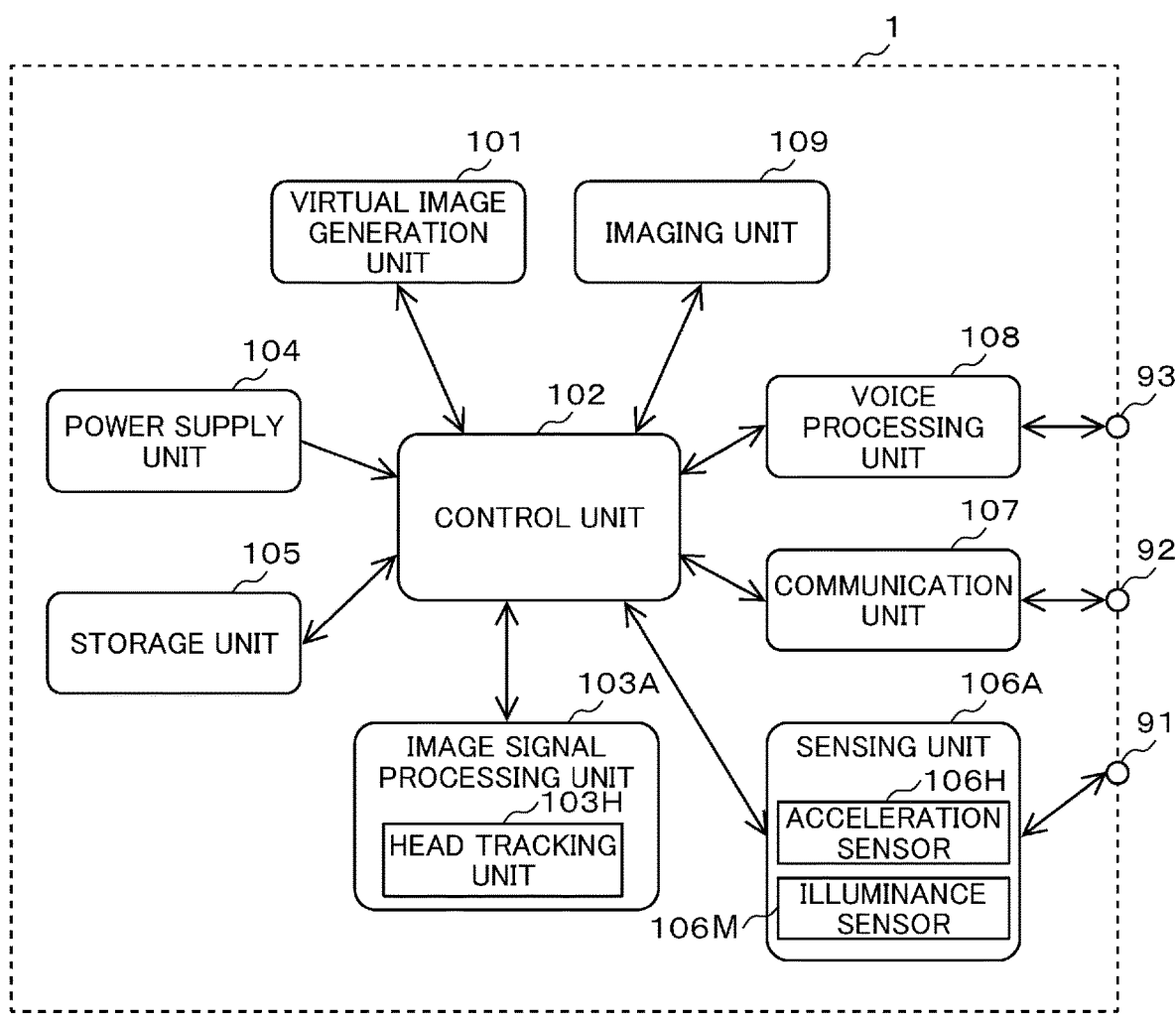
FIG. 14 is a block configuration diagram of an HMD in Example 3.

FIG. 14 is a block configuration diagram of the HMD in this example. In FIG. 14, the same configuration as in FIG. 1A is designated by the same reference numeral, and a description thereof will be omitted. A difference of FIG. 14 from FIG. 1A partially resides in that the head tracking function is added. That is, an image signal processing unit 103A of the HMD 1 is provided with a head tracking unit 103H. The head tracking unit 103H detects the direction of the user 2's head based on information from an acceleration sensor 106H of a sensing unit 106A, and changes the display content according to the direction of the head.

In addition, the HMD is used indoors and outdoors. Therefore, it is necessary to adjust the brightness of the displayed image according to the brightness of the surrounding environment. As an example, an illuminance sensor 106M may be mounted on the sensing unit 106A, and the brightness of the image displayed by the image signal processing unit 103A may be adjusted according to an output of the illuminance sensor.

Although the examples according to the present invention have been described above, the present invention is not limited to the abovementioned examples, and includes various modifications. For example, the functional configurations of the abovementioned HMD and the virtual image generation unit are classified according to the main processing contents for easy understanding. The present invention is not limited by the method and name of classification of the components. The configurations of the HMD and the virtual image generation unit can be classified into more components according to the processing content. Also, one component can be classified so as to perform more processing.

Needless to say, the present invention can be similarly applied not only to the HMD but also to other image (virtual image) display devices having the configuration of the virtual image generation unit described in each example.

It is also possible to replace a part of the configuration of one example with the configuration of another example. It is also possible to add the configuration of another example to the configuration of one example. It is also possible to add, delete, or replace a part of the configuration of the example with another configuration.

What is claimed is:

1. A head mounted display that displays an image in a user's field of view, comprising:
    an image display unit that generates an image to be displayed;
    a projection unit that projects image light from the image display unit;
    a first light guide plate and a second light guide plate that duplicate the image light from the projection unit,
    wherein the first light guide plate and the second light guide plate each include a set of parallel main surfaces that confine the image light by internal reflection,
    wherein the first light guide plate includes an incident surface that reflects the image light inward, and two or more emission reflective surfaces that emit the image light to the second light guide plate,
    wherein the incident surface and the emission reflective surface are parallel to each other and are disposed at an angle different from the main surface,
    wherein the second light guide plate includes an input unit that couples the image light from the first light guide plate to inside the second light guide plate, and an output unit that emits the image light to the user's pupil,
    wherein the input unit of the second light guide plate includes one or more incident reflective surfaces, and the output unit includes a group of two or more emission reflective surfaces, and
    wherein the incident reflective surface and the emission reflective surface group are parallel to each other and at an angle different from that of the main surfaces of the second light guide plate.

2. The head mounted display according to claim 1,
    wherein the input unit of the second light guide plate includes an incident transmission surface, wherein the incident transmission surface and the emission reflective surface are parallel to each other and have different angles from the main surface, and wherein an optical path correction prism having an apex angle θ is disposed between the first light guide plate and the second light guide plate, and the main surface of the first light guide plate is placed at an angle of 2θ toward a side of the user's pupil with respect to the main surface of the second light guide plate.

3. The head mounted display according to claim 1, wherein a distance between the reflective surfaces of the emission reflective surface of the first light guide plate and a distance between the reflective surfaces of the emission reflective surface of the second light guide plate are smaller than a diameter of the projection unit.

4. The head mounted display according to claim 1, wherein a placement direction of the two or more emission reflective surfaces of the first light guide plate and a placement direction of the two or more emission reflective surfaces of the second light guide plate are different from each other, and wherein a reflectance of a partial reflective surface of the first light guide plate is higher as the partial reflective surface becomes farther from the incident surface.

5. The head mounted display according to claim 1, wherein the main surface of the first light guide plate and the main surface of the second light guide plate are substantially parallel to each other, wherein the main surface of the first light guide plate and the main surface of the second light guide plate are in different planes, and wherein the main surface of the first light guide plate is disposed at a side closer to the projection unit than the main surface of the second light guide plate.

6. The head mounted display according to claim 1, wherein tilt angles of the incident surface and the emission reflective surface with respect to the main surface of the first light guide plate are in a range of 16° to 40°.

7. The head mounted display according to claim 1, wherein a third light guide plate is disposed between the first light guide plate and the second light guide plate, wherein the third light guide plate has a set of substantially parallel main surfaces that confine the image light by internal reflection, wherein the third light guide plate includes an incident surface that reflects the image light from the first light guide plate inward, and two or more emission reflective surfaces that emit the image light to the second light guide plate, and wherein an incident reflective surface and the emission reflective surface of the third light guide plate are substantially parallel to each other and have an angle different from that of the main surface.

8. The head mounted display according to claim 7, wherein the main surfaces of the first light guide plate, the second light guide plate, and the third light guide plate are substantially parallel to each other, wherein the main surface of the first light guide plate, the main surface of the second light guide plate, and the main surface of the third light guide plate are in different planes, wherein the main surface of the third light guide plate is disposed at a side closer to the projection unit than the main surface of the second light guide plate, and wherein the main surface of the first light guide plate is disposed at a side closer to the projection unit than the main surface of the third light guide plate.

9. The head mounted display according to claim 7, wherein a thickness between the main surfaces of the third light guide plate is thinner than a thickness between the main surfaces of the first light guide plate.

10. The head mounted display according to claim 7, wherein a distance between the reflective surfaces of the emission reflective surface of the first light guide plate, a distance between the reflective surfaces of the emission reflective surface of the second light guide plate, and a distance between the reflective surfaces of the emission reflective surface of the third light guide plate are all smaller than the diameter of the projection unit.

11. The head mounted display according to claim 7, wherein the incident surface of the second light guide plate includes two or more reflective surfaces, whose reflectance is higher at a side closer to the projection unit.

12. The head mounted display according to claim 7, wherein a tilt angle of the emission reflective surface with respect to the main surface of the first light guide plate is a predetermined angle θ, wherein a tilt angle of the emission reflective surface with respect to the main surface of the third light guide plate is a predetermined angle −θ, wherein the tilt angle θ is in a range of 16° to 40°, wherein a placement direction of the emission reflective surfaces of the first light guide plate and a placement direction of two or more emission reflective surfaces of the third light guide plate are the same, and wherein the placement direction of the emission reflective surfaces of the first and third light guide plates is different from the placement direction of the second light guide plate.

13. The head mounted display according to claim 1, further comprising:
a power supply unit that supplies power;
a sensing unit that detects a position and a posture of the user;
a voice processing unit that inputs or outputs an audio signal; and
a control unit that controls the power supply unit, the sensing unit, and the voice processing unit.

14. The head mounted display according to claim 1, further comprising:
an accelerometer that detects movement of the user's head;
a head tracking unit that changes a display content according to the movement of the user's head;
a power supply unit that supplies power;
a voice processing unit that inputs or outputs an audio signal; and
a control unit that controls the acceleration sensor, the head tracking unit, the power supply unit, and the voice processing unit.

* * * * *